US007185910B2

(12) United States Patent
Beauchesne et al.

(10) Patent No.: US 7,185,910 B2
(45) Date of Patent: Mar. 6, 2007

(54) MULTI ADJUSTABLE CHAIR

(75) Inventors: André Beauchesne, Duvernay Est (CA); Jean-Pierre Baril, Terrebonne (CA); Michel Bayard, Terrebonne (CA)

(73) Assignee: Positech Innovation Inc., Lachenaie (CA)

( * ) Notice: Subject to any disclaimer, the term of this patent is extended or adjusted under 35 U.S.C. 154(b) by 368 days.

(21) Appl. No.: 10/725,555

(22) Filed: Dec. 3, 2003

(65) Prior Publication Data

US 2005/0121961 A1 Jun. 9, 2005

(51) Int. Cl.
*B62B 9/12* (2006.01)
*A47C 1/022* (2006.01)
*A47C 3/00* (2006.01)
*B60N 2/02* (2006.01)

(52) U.S. Cl. .................. 280/650; 297/284.3; 297/311; 297/337; 297/452.23; 297/452.33

(58) Field of Classification Search ............ 297/284.3, 297/284.9, 284.11, 445.1, 452.1, 452.4, 311, 297/300.1, 353, 301.1, 337, 325, 329, 452.23, 297/452.33; 280/650
See application file for complete search history.

(56) References Cited

U.S. PATENT DOCUMENTS 4,732,423 A * 3/1988 Condon .................. 297/284.1
5,020,816 A * 6/1991 Mulholland .............. 280/250.1
5,228,747 A * 7/1993 Greene .................... 297/284.3
5,564,786 A * 10/1996 Peek et al. ............... 297/452.4
5,588,708 A 12/1996 Rykken et al.
5,593,211 A 1/1997 Jay et al.
5,634,688 A 6/1997 Ellis
5,681,084 A * 10/1997 Yoneda .................. 297/284.9
6,352,307 B1 * 3/2002 Engman ................ 297/284.11
6,378,947 B1 * 4/2002 Barber et al. .......... 297/452.25
6,454,353 B1 9/2002 Knaus
2001/0004164 A1 * 6/2001 Mattsson ............... 297/284.11

* cited by examiner

*Primary Examiner*—Lesley D. Morris
*Assistant Examiner*—Daniel Yeagley
(74) *Attorney, Agent, or Firm*—Ogilvy Renault LLP; Guy J. Houle

(57) ABSTRACT

A multi adjustable chair is comprised of a support frame to which is secured an adjustable seat assembly and an adjustable backrest assembly. The backrest assembly has displaceable back support plates that are adjustable to a desired position. A back cushion is secured over back support elements and is displaceable in unison therewith as the backrest is extended or retracted. The seat assembly has a pair of laterally displaceable seat panels as well as a front guide frame and the seat cushion is also extendable both laterally and forwardly as the seat panels and front guide frame are displaced to adjust the size of the seat assembly. The adjustable chair is preferably, but not exclusively, a wheelchair and it is provided with an adjustable support base assembly and a chair tilting mechanism.

45 Claims, 13 Drawing Sheets

MULTI ADJUSTABLE CHAIR

FIELD OF THE INVENTION

The present invention relates to an adjustable chair and more particularly, but not exclusively, to an adjustable wheelchair and as well to the adjustable seat assembly and adjustable backrest assembly thereof.

BACKGROUND OF THE INVENTION

Wheelchairs having adjustable component parts are known and an example thereof is described and illustrated in U.S. Pat. No. 5,593,211. It is also known to extend the seat portion of a chair having an extendable cushion thereon, such as described in U.S. Pat. Nos. 5,588,708 and 6,454,353. However, these adjustable features only apply to few component parts of a chair or a wheelchair and usually such chairs are custom fit for an intended user and this is particularly so with wheelchairs for handicapped persons.

When constructing a wheelchair for a handicapped person, such as a paraplegic person, it is customary to create a mold of a portion of that person's body and construct a chair with molded parts and adjustable pads to fit that particular person. This is a costly procedure. Further, if that person is of a younger age and is still growing, then that chair becomes uncomfortable to the person as his body dimensions change and it is then required to reconstruct parts of the chair. Because of the high cost of constructing these chairs often handicapped persons are fitted with chairs of inferior quality and the result is that they can lead a very uncomfortable life.

There is also a need to provide a chair or sofa wherein the seat portion may be automatically adjusted to suit an intended user for a short period of time to make the user comfortable. The backrest may also be adjusted in a similar manner and each time the user changes, the seat and backrest are modified. This can be done by the intended user or automatically if the size parameters of the user is known.

There is a further need to provide an adjustable support base assembly for wheelchairs wherein the position of the chair can be modified depending on the intended user while maintaining the same wheels or providing only a few wheel sizes whilst maintaining the center of gravity along the axle of the main wheels.

SUMMARY OF THE INVENTION

It is therefore a feature of the present invention to provide an adjustable wheelchair for a handicapped person and which substantially overcomes the above mentioned disadvantages of the prior art.

Another feature of the present invention is to provide an adjustable chair seat which substantially overcomes the above mentioned disadvantages of the prior art and which may be used in combination with an adjustable backrest assembly as described herein.

A still further feature of the present invention is to provide an adjustable support base assembly for a wheelchair and which provides the above mentioned desired needs of the prior art.

A still further feature of the present invention is to provide a seat assembly tilting mechanism to displace the seat assembly of a wheelchair along the gravity axis of the chair.

According to the above features, from a broad aspect, the present invention provides an adjustable chair comprising a support frame with an adjustable seat assembly secured thereto. An adjustable backrest assembly is secured to a back support frame. The adjustable backrest assembly has displaceable back support elements. Backrest adjustment means is provided to adjustably secure the back support elements to a desired position to adjust the vertical length of the backrest. The backrest has a back cushion secured thereto. The back cushion is secured to a cushion extension and retraction mechanism to retract or extend a portion of the cushion in synchronism with the back support elements as the back support elements are displaced along the back support frame to retract or extend the backrest assembly lengthwise. The adjustable seat assembly has a pair of laterally displaceable seat panels each secured to a common laterally displacing mechanism operable to displace the panels to or away from one another in unison to provide equal lateral adjustment of the adjustable seat on opposed sides of a central plane aligned with the backrest. The adjustable seat assembly also has a displaceable front guide frame provided with a seat depth adjustable mechanism to extent and retract the front guide frame. A seat cushion is provided with opposed lateral sections which are extendable or retractable with the displacement of the seat panels and a frontal section which is extendable or retractable in unison with the displacement of the front guide frame.

According to a still further broad aspect of the present invention there is provided an adjustable chair seat which comprises a seat support frame and a pair of laterally displaceable seat panels each secured to a common laterally displacing mechanism operable to displace the panels to or away from one another in unison to provide equal lateral adjustment of the adjustable seat on opposed sides of a central plane aligned with the backrest. The adjustable seat assembly also has a displaceable front guide frame provided with a seat depth adjustable mechanism to extend and retract the front guide frame. A seat cushion is provided with opposed lateral sections which are extendable or retractable with the displacement of the seat panels, and a frontal section which is extendable or retractable in unison with the displacement of the front guide frame.

According to a still further broad aspect of the present invention there is provided an adjustable support base assembly for a wheel chair. The assembly comprises a multi-position wheel mounting plate secured to a support frame for securing axels of opposed wheels to the frame at a desired position. Each mounting plate is secured to the support frame and has a front caster support slidingly secured to a connecting ramp of the mounting plate to provide a position adjustment for front casters of the front caster support and relative to the seat assembly whereby to permit a user person to touch a floor support surface with its feet.

According to a still further broad aspect of the present invention there is provided in combination with the above-mentioned adjustable support base assembly, a seat assembly tilting mechanism to displace the seat assembly along a gravity axis of the wheels. The gravity axis extends vertically and aligned with the axle of the wheels.

BRIEF DESCRIPTION OF THE DRAWINGS

The preferred embodiment of the present invention will now be described with reference to the accompanying drawings in which.

DETAILED DESCRIPTION OF THE PREFERRED EMBODIMENT

Figure 1:
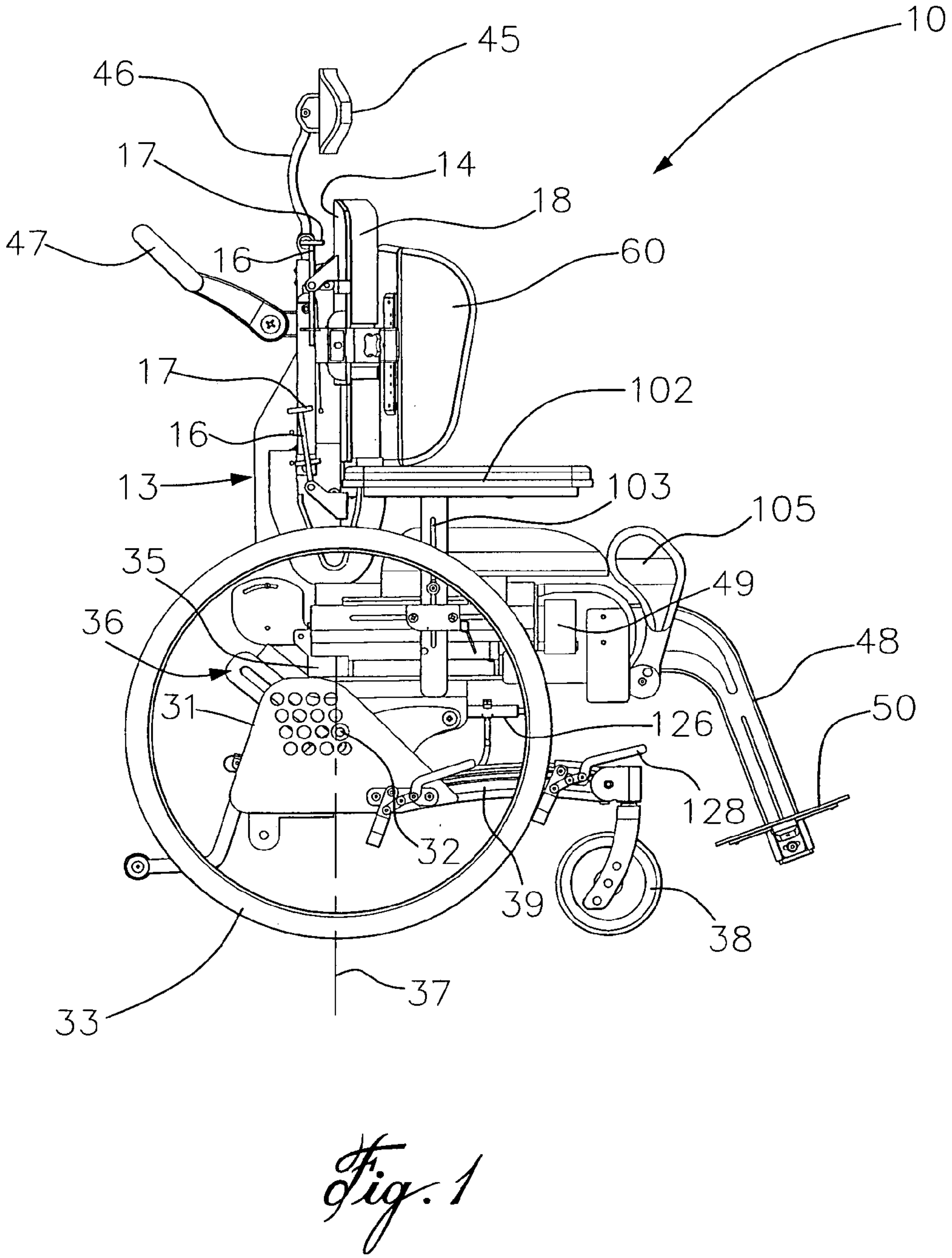
FIG. 1 is a side view of the multi adjustable wheelchair constructed in accordance with the present invention.
Figure 2:
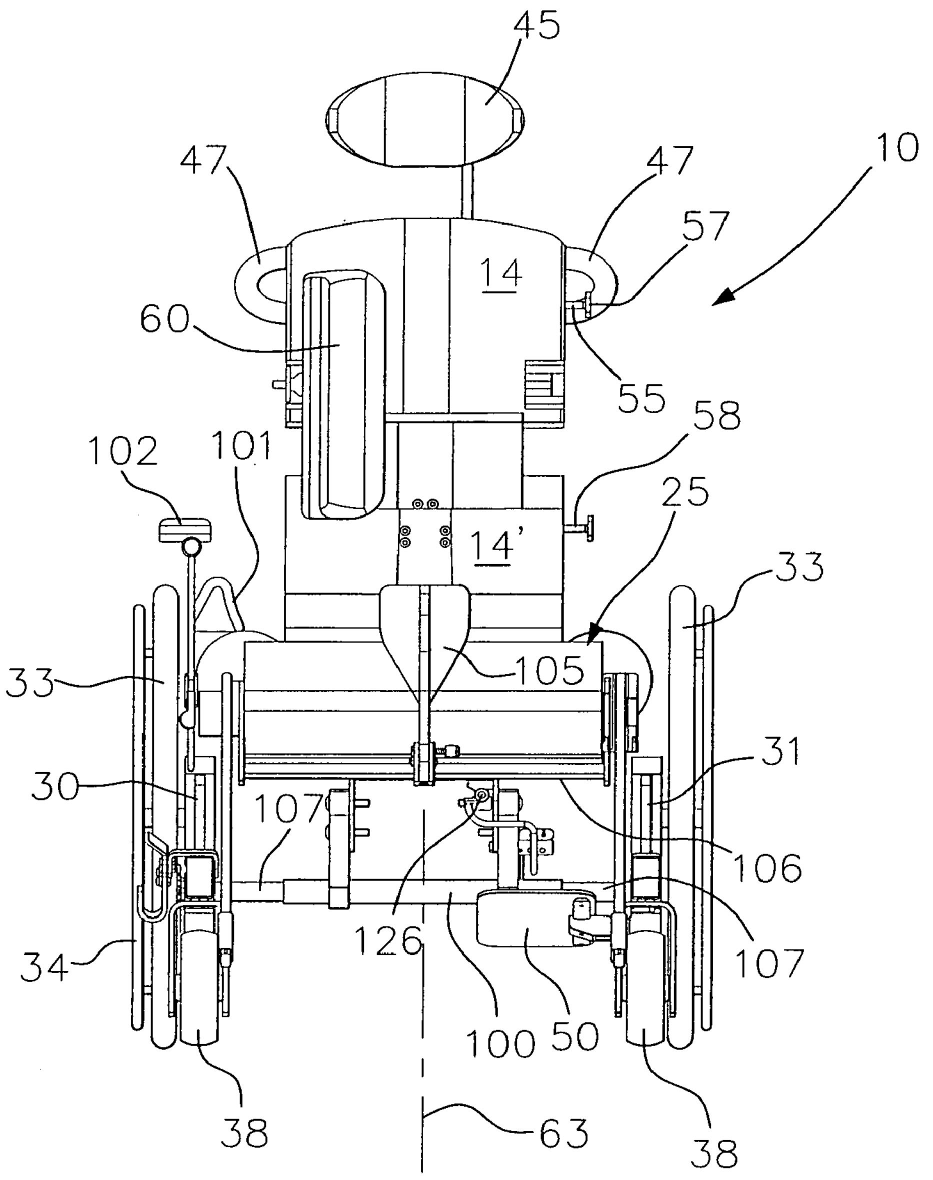
FIG. 2 is a front view of the multi adjustable wheelchair with portions thereof having been omitted.
Figure 3:
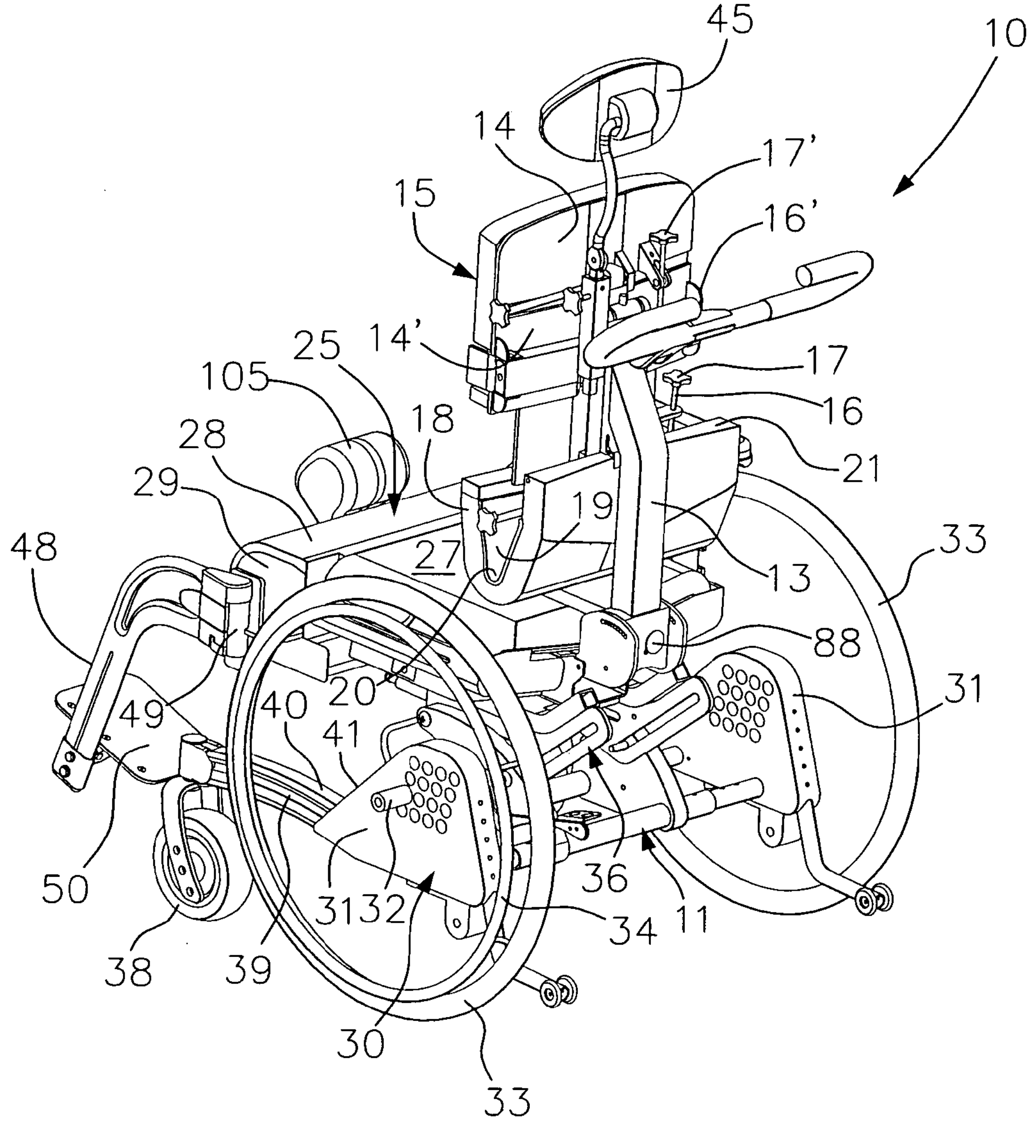
FIG. 3 is a rear perspective view of the multi adjustable wheelchair with parts thereof having been omitted for better illustration of some of the component parts of the wheelchair.

Referring now to the drawings and more particularly to FIGS. 1 to 3 there is shown generally at 10 the multi adjustable wheelchair constructed in accordance with the present invention. As herein shown the multi adjustable wheelchair has a support frame assembly 11 which is provided by various structural parts of the wheelchair and which will be described later. Generally, the multi adjustable wheelchair has an adjustable backrest assembly 12 which is secured to a back support frame 13. The adjustable backrest assembly 12 is provided with displaceable back support elements or plates 14 and 14' which are adjustable to extend the back support portion 15 longitudinally. The displacement of these back support plates 14 and 14' is provided by adjustable threaded elements or rods 16 and 16'. As herein shown, the rods are provided with hand operable knobs 17 and 17' to provide the adjustment manually. However, these rods may have connectors or chucks at their free end for engagement with a power tool, such as a drill, whereby the adjustment can be done more quickly. These rods constitute a linear drive. Accordingly the back support portion 15 can be extended or retracted to a desired position to adjust the vertical length of the back support portion 15.

A back cushion 18 is secured to the top back support plate 14 and is trained about a lower guide frame 19 which is provided with a curved lower portion 20 to guide the cushion 18 thereunder. The free end 21 of the cushion is secured to an extension or retraction mechanism which works in unison with the displacement of the top back support plate 14 whereby the cushion is also retracted or extended as the back support portion 15 is modified or as the top back support plate is displaced up or down along the back support frame 13.

The wheelchair 10 is also provided with an adjustable seat assembly 25 which will be described later, but as illustrated in FIG. 3, that seat assembly is also provided with a seat cushion 26 which has opposed lateral sections 27 which are extendable or retractable under the seat and a frontal section 28 which is also extendable or retractable with the displacement of a displaceable front guide frame 29.

An adjustable support base assembly 30 is also provided and has a multi-position wheel mounting block or plate 31 which is secured to the support frame 11 and provides for a multi-positioning of the axels 32 of the wheels 33 of the wheelchair. The wheels 33 are also provided with a push rim 34 as is commonly known whereby the user of the chair can displace himself, if he has capacity to do so, by engaging this push rim.

The chair seat frame 35 on which the seat assembly 25 is secured is also mounted on a seat tilting mechanism 36 as will be described later, whereby to adjust the seat frame 35 and the back support frame, 13, connected thereto at a tilt angle with respect to the gravity axis 37 which is located vertically with the axle 32 of the wheels 33. Of course, the wheels 33 on opposed sides are mounted along a straight transverse axis to these wheel mounting plates 31.

The multi adjustable wheelchair 10 is further provided with front casters 38 which are secured to caster support arms 39 which are slidingly secured at a connecting end 40 to a straight inclined ramp 41 of the wheel mounting plate 31. Accordingly, the wheelchair can be lowered by adjusting the support arms 39 along the ramp 41.

As herein shown, the wheelchair is further equipped with a headrest 45 secured to an adjustable frame 46. Handgrips 47 are provided for pushing the wheelchair along a floor surface when the handicapped person cannot operate the wheels or a motor drive (not shown) which may be incorporated with the wheelchair.

The wheelchair is also provided with footrest support arms 48 which are pivotly connected at 49 to a frame member whereby to displace them laterally outwards to clear the foot pads 50 from the front of the wheelchair.

Referring now to FIGS. 4A to 6, there is illustrated in more detail the construction of the back rest assembly 12. As herein shown the top back support plate 14 and the lower guide frame 19 are booth secured to a tilt bracket 14" and 19' respectively, whereby to adjust the angle thereof relative to a common plane of the backrest assembly. To position the top support plate 14 and lower guide frame 19 to a desired position it is first necessary to free the hinge 55 which has been locked by a locking rod 55' which actuates a locking plate assembly 56. The locking rods are provided with a hand knob, 57 at the end thereof to lock or unlock the lock plate assembly. It is pointed out that these rods may be provided with a chuck instead of a hand operable knob 57 whereby to be engaged by a power tool such as an electric drill whereby, to engage or disengage the linear drives for locking or unlocking the locking plate assembly. The tilt bracket 19' of the lower guide frame 19 is provided with a like locking rod 58 which operates in the same manner.

Figure 4A:
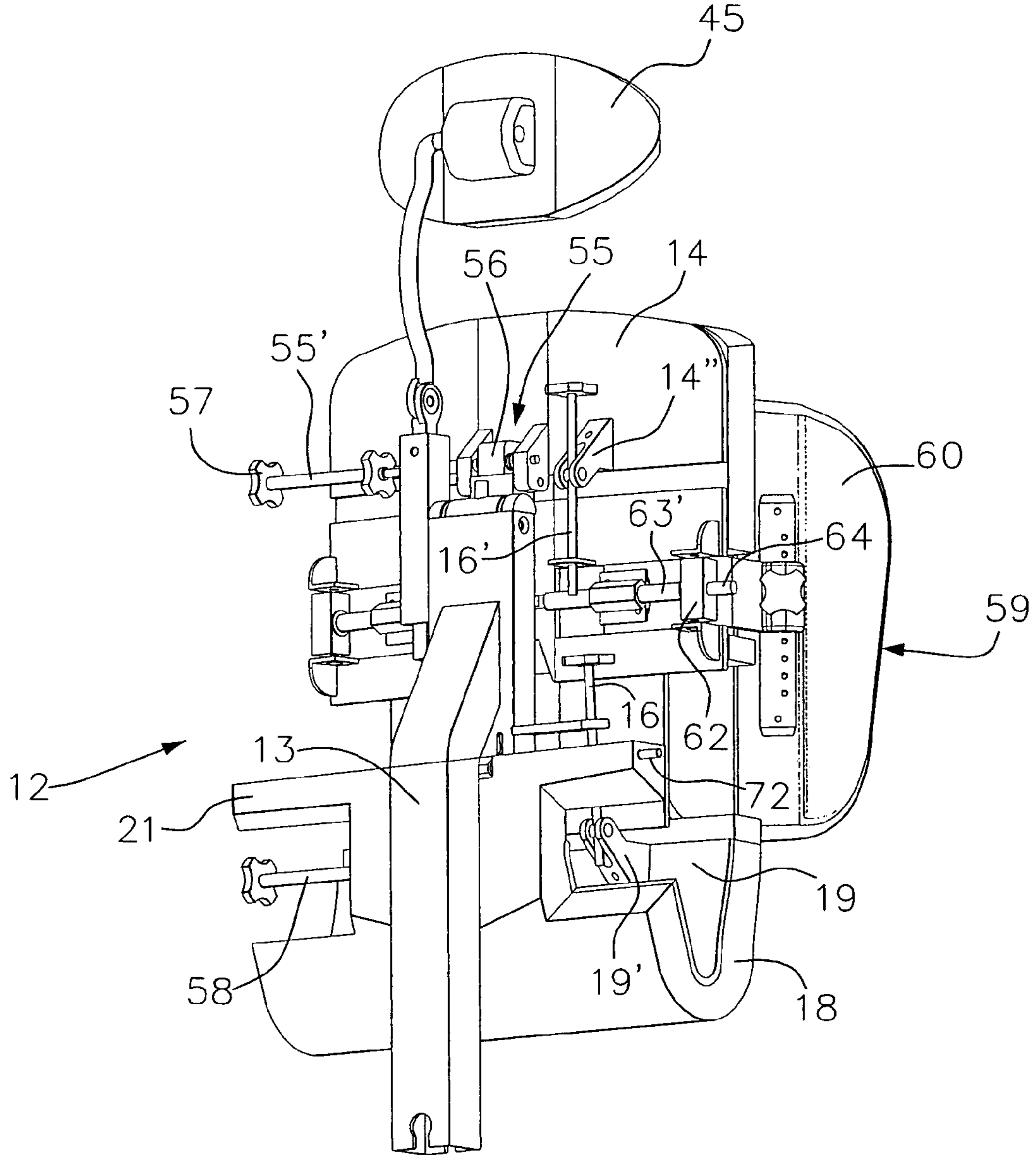
FIG. 4 is a rear perspective view of the backrest assembly.
FIG. 4B is a perspective rear view of the seat assembly and backrest assembly secured to one another.
Figure 4B:
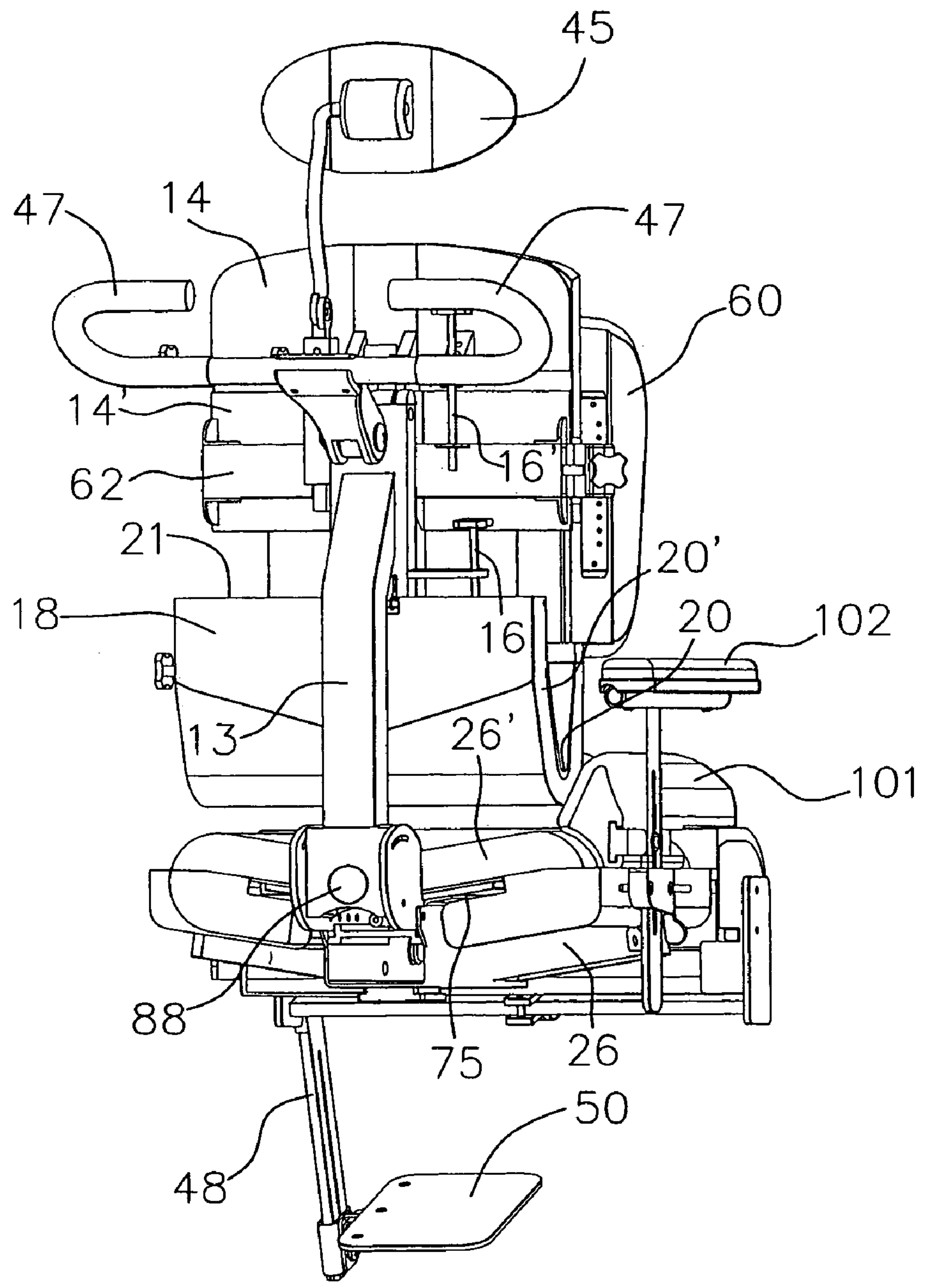
Figure 5:
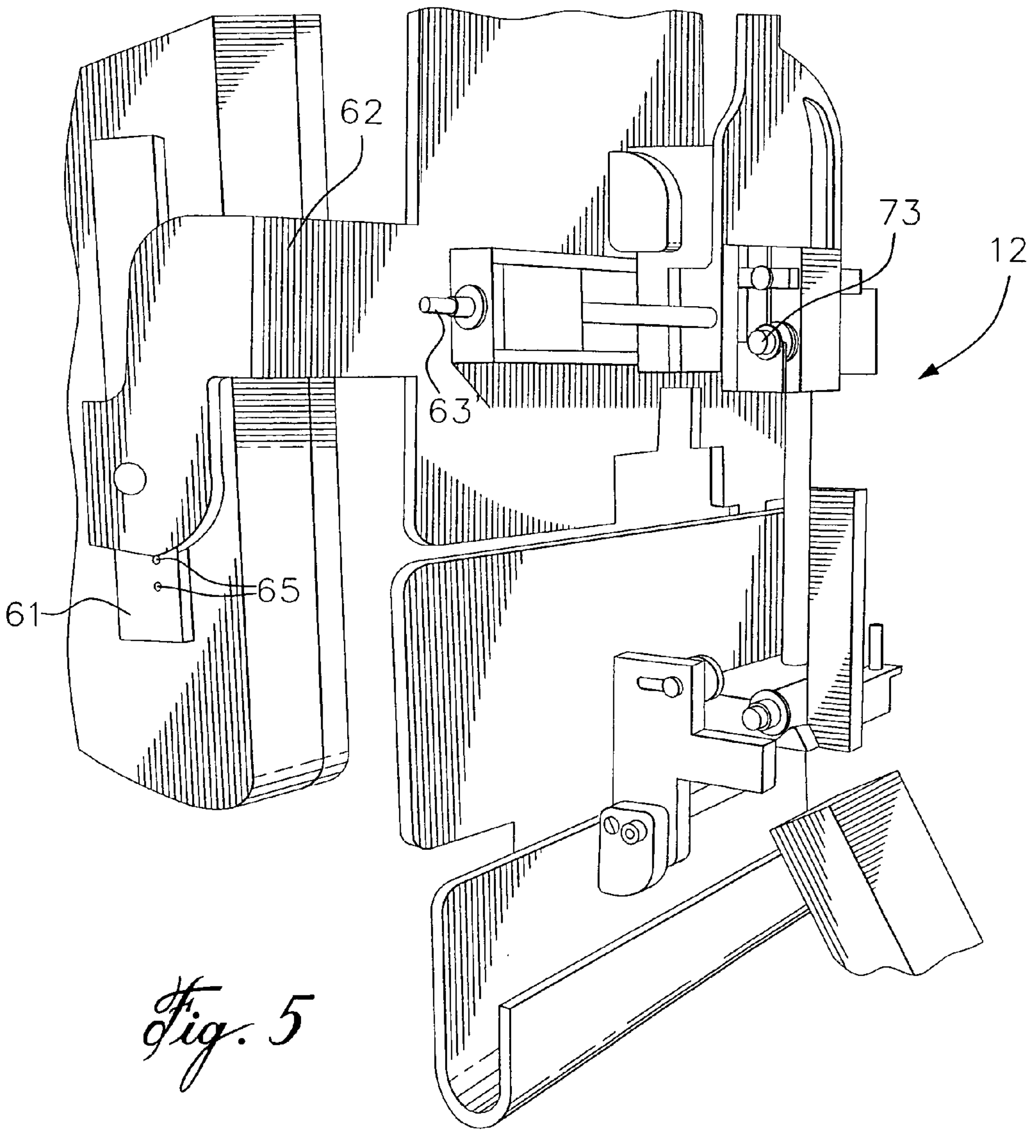
FIG. 5 is an enlarged view of the backrest panels and its adjustment mechanism.

As more clearly illustrated in FIGS. 4A, 4B and 5, the backrest assembly 12 is further provided with an adjustable upper side body restraining assembly 59 which is provided with side pads 60 adjustably secured on both sides of the backrest assembly. Each of the side pads 60 has a mounting bracket 61 secured to a horizontally displaceable support arm 62 whereby to adjust the spacing of each of the side pads

60 relative to the central plane 63 of the chair as shown in FIG. 2. The horizontally displaceable support arm 62 of each of the side pads 60 are interconnected together by a common side pad adjusting mechanism which comprises a threaded rod 63' which is equipped with a rotateably displaceable drive element 64 at one end thereof whereby to impart rotation of the rod to effect the side displacement of the pads to and away from the back seat cushion 18. It is further pointed out that these side pads 60 are interchangeable and adjustable vertically by the mounting bracket 61 which is provided with a series of connecting holes 65 to effect this adjustment.

Figure 6:
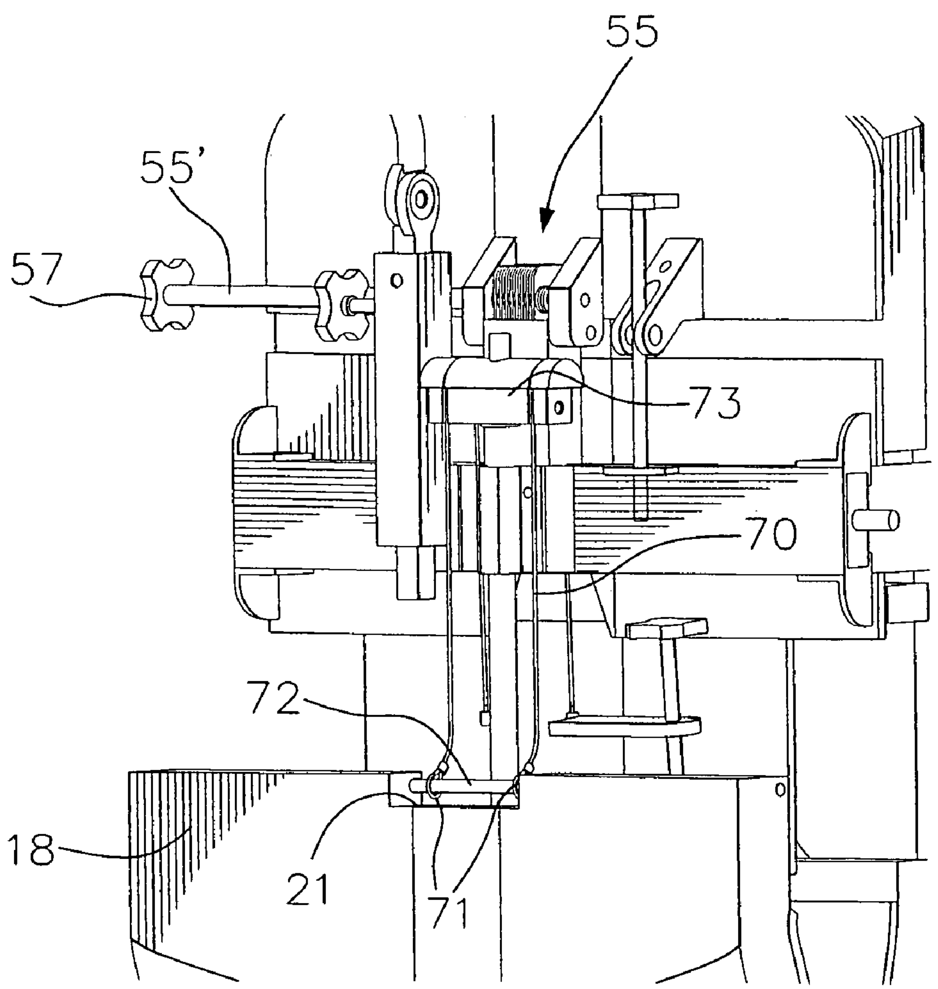
FIG. 6 is a rear perspective view of portions of the backrest assembly illustrating a hand operable panel adjustment mechanism as well as a locking mechanism.
Figure 7:
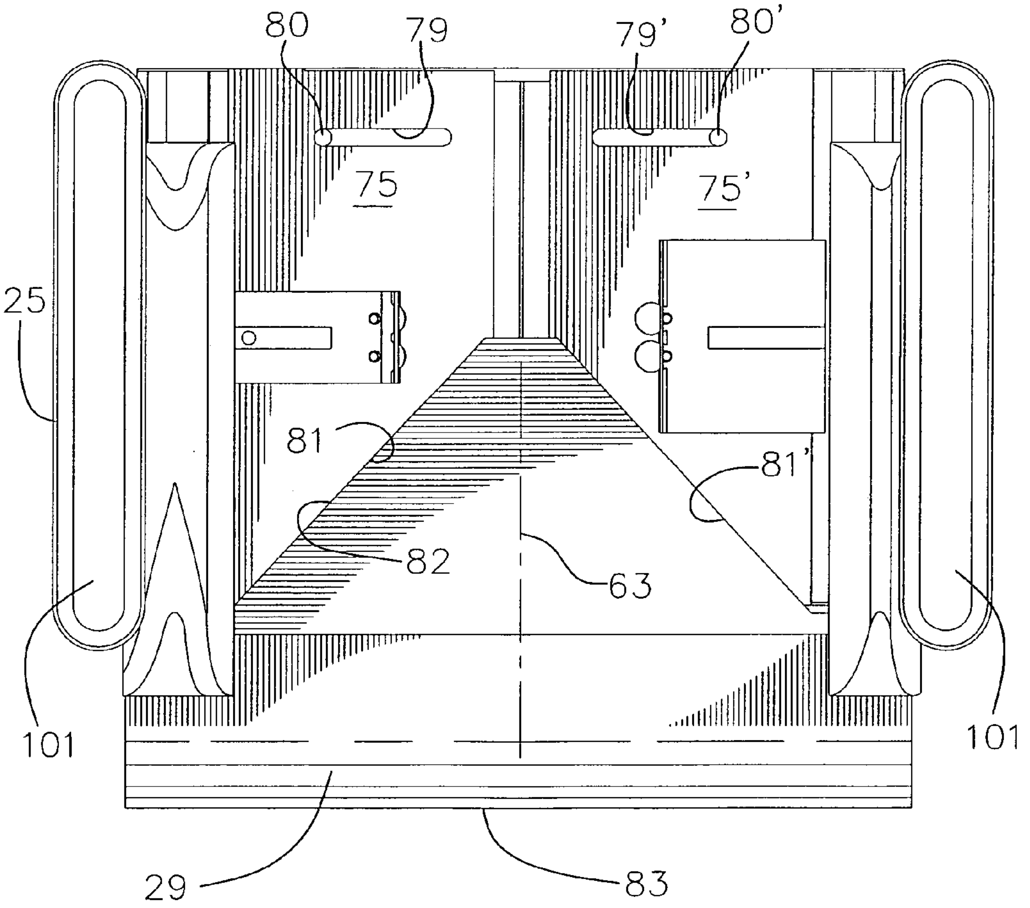
FIG. 7 is a perspective top view showing the adjustable panels of the seat assembly as well as the displaceable front guide frame and other component parts thereof.

As is better seen from FIGS. 5 and 6 the cushion extension and retraction mechanism is a cable and pulley mechanism having a cable 70 secured at one end 71 thereof to the free lower end 21 of the backrest cushion 18. As herein shown, a connecting rod, 72 is secured within the free end 21 of the cushion 18. The cable 70 is trained about a stationary pulley 73 and the other end of the cable is secured to an associated one of the top back support plate 14 or the central displaceable back support plate 14'. There are, of course, two cable and pulley mechanisms, one for each of the displaceable back support plates 14 and 14'.

As shown in FIG. 4B the lower cushion curved portion 20 extends rearwardly of the backrest as shown at 20' behind the backrest and the curve portion is in close proximity to a rear end 26' of the seat cushion 26.

With reference now to FIGS. 7 to 9B there will be described the construction operation of the adjustable seat assembly 25. The seat assembly comprises a pair of laterally displaceable seat panels 75 and 75' which are displaceable by a common endless threaded bolt 76 at an engageable free end 77 thereof to impart rotation to the endless bolt. The threaded bolt 76 is in engagement with a threaded nut 78 and 78', secured to the panels 75 and 75' respectively. By rotating the bolt 76 the panels move to and away from one another. The panels are also provided with a guide slot 79 and 79', respectively, through which a guide pin 80 and 80', respectively, is located whereby to maintain the panels in perfect alignment during their displacement. Each panel is also provided with an angled straight front edge 81 and 81' against which the V-shaped rear edge 82 of the frame 29 abuts when the displaceable front guide frame 29 is fully retracted. The displaceable front guide frame has a rounded front edge 83 to facilitate the displacement of the seat cushion thereabout.

Figure 8:
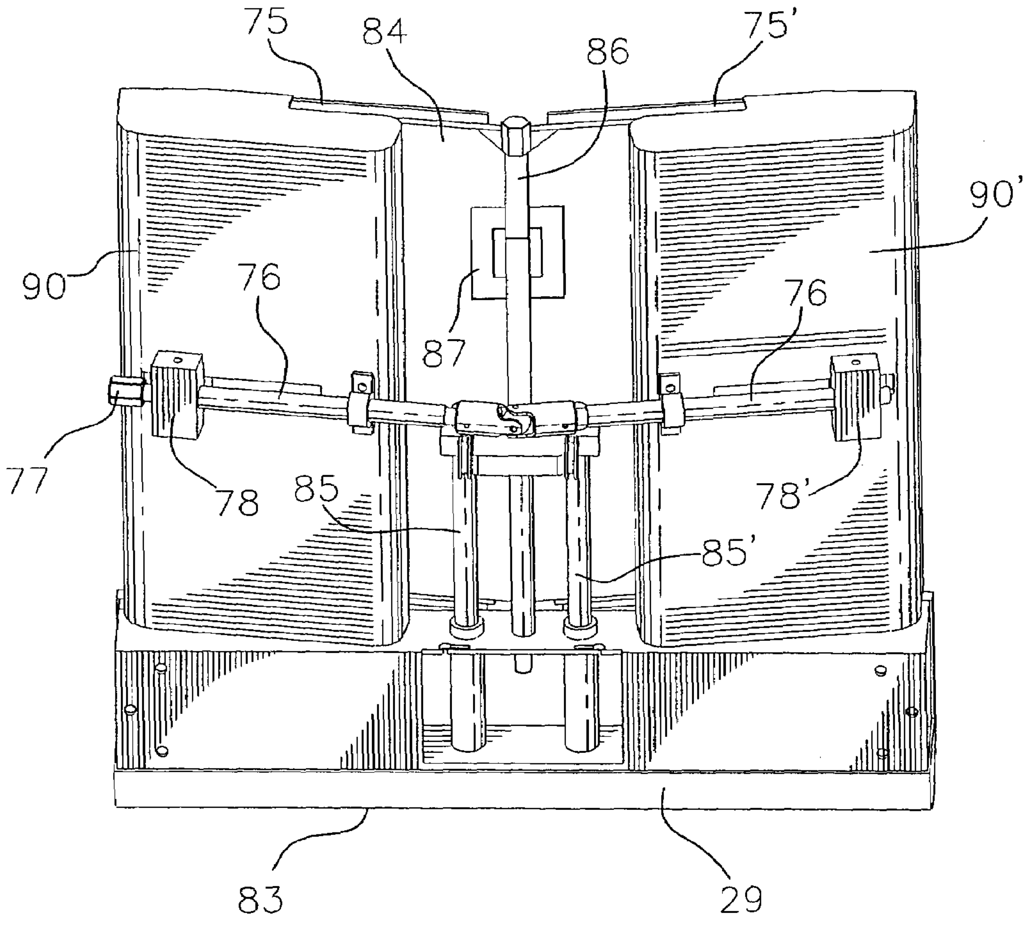
FIG. 8 is a bottom view of the seat panels and its connection to the front guide frame.

As shown in FIG. 8, the laterally displaceable seat panels 75 and 75' are displaceable over a lower central seat panel 84 whereby to provide a solid support surface for the seat cushion 26 regardless of the position of the laterally displaceable seat panels. The displaceable front guide frame 29 is secured to the lower central seat panel 84 by a pair of space rigid guide rods 85 and 85' to substantially prevent flexing of the front guide frame 29 relative to the seat panels. A drive rod 86 is connected at a front end to the front guide frame and is in threaded engagement with an immovable frame member 87 secured to the central panel 84 or to a stationary frame member (not shown) whereby to displace the front guide frame to and away from the front edges 81 and 81' of the seat panels. Preferably, as herein shown, the central seat panel is concavely and slightly V-shaped and together with the laterally displaceable seat panels constitutes a concave seat support which is more comfortable to the intended user.

As shown in FIG. 1, the seat panels are secured to a seat frame 35 which is a removable frame whereby the entire seat assembly can be removed from the other frame elements. Also, the backrest assembly is detachable from the seat frame by removing the connector pin 88 as illustrated in FIG. 3. Therefore, the entire wheel chair can be easily transported or easily repaired by changing component parts thereof.

Figure 9A:
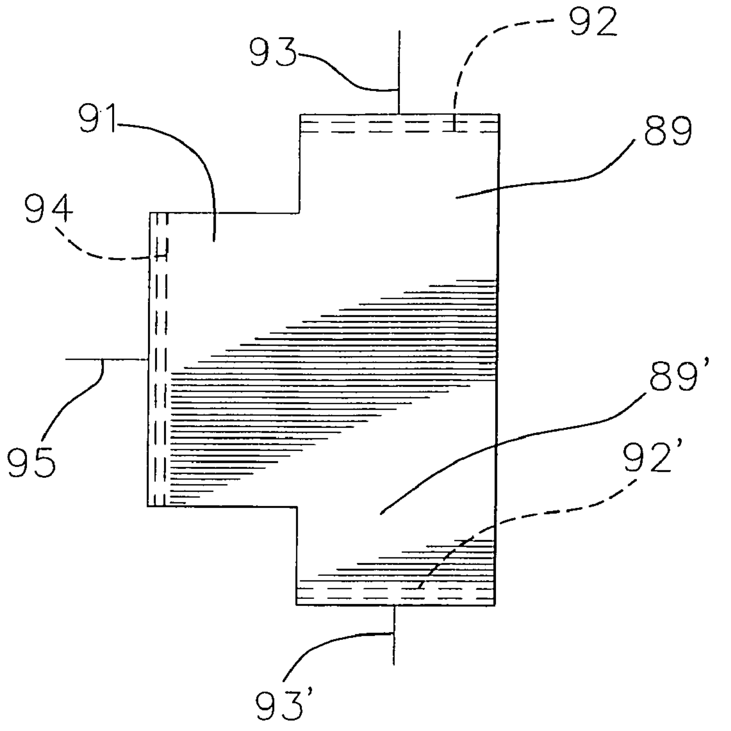
FIG. 9 is a schematic top view showing the configuration of the seat cushion.
FIG. 9B is a perspective view showing the seat cushion configuration when in use and portions thereof retracted under the seat panels and front guide frame.
Figure 9B:
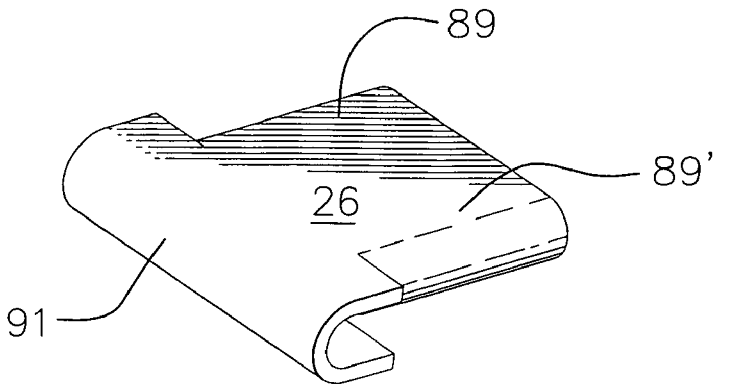
Figure 10:
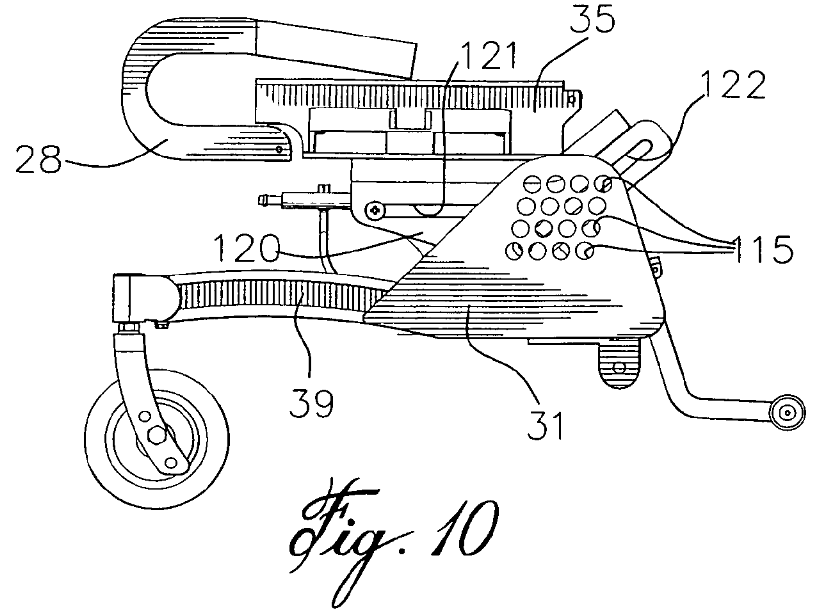
FIG. 10 is a side view illustrating the construction of the adjustable support base assembly.
Figure 11:
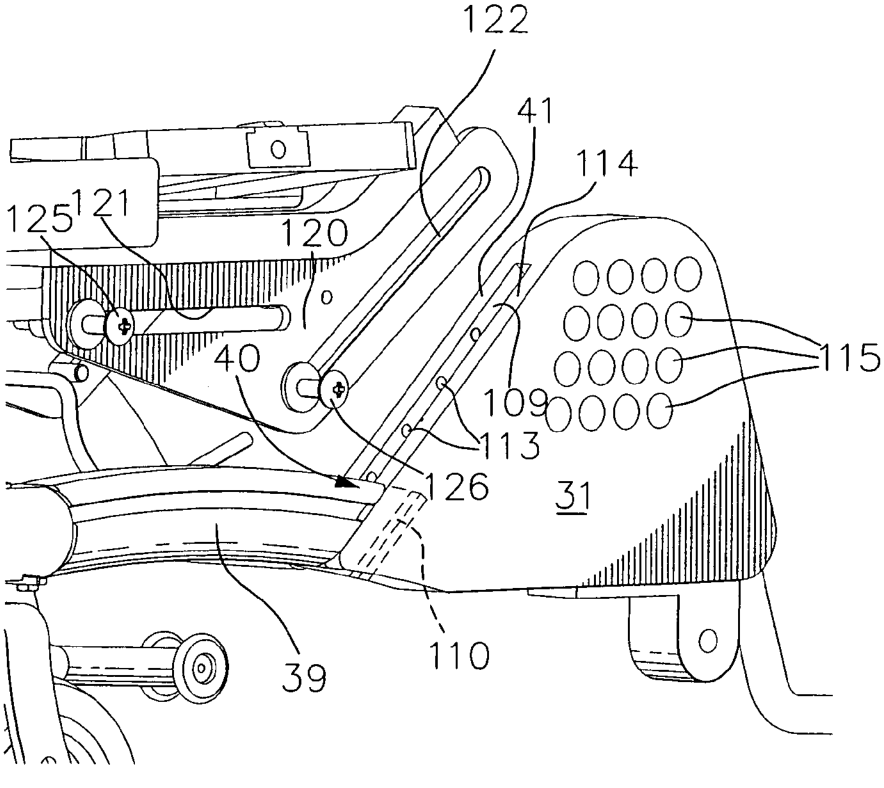
FIG. 11 is an enlarged view slightly in perspective showing the configuration of the multi-position wheel mounting plate and its connection to the caster support along its connecting ramp.

Referring now to FIGS. 9A and 9B, there is shown the shape of the seat cushion 26 and it is provided with opposed lateral sections 89 and 89' which, as will be described later, are displaceable about the outer side edges 90 and 90' of the seat panels 75 and 75' and a frontal section 91 which has a frontal portion thereof extending about the rounded front edge 83 of the displaceable front guide frame 29. The opposed lateral sections 89 and 89' of the seat cushion are provided with attachment pins 92 and 92' to which are secured, respectively, wires 93 and 93' which are trained about pulleys (not shown) whereby the lateral sections 89 and 89' can be extended or retracted as the seat panels are extended or retracted. This pulley and cable mechanism is similar and operates in a similar manner as the one described for the back seat cushion. Similarly, the frontal section 91 is also provided with an attachment pin 94 at the front edge thereof which is secured to a wire 95 which is also trained about pulleys and configured in a manner to retract or extend the cushion as the displaceable front guide frame 29 is extended or retracted. Accordingly, the seat and seat cushion are extendable both laterally and in depth. The wires 93 and 93' of the lateral sections 89 and 89' are secured at an opposed end to its associated seat panel 75 and 75' and trained taunt about a pair of stationary guide pulleys whereby to obtain the desired result mentioned herein above. The wire 95 of the frontal section 91 is secured at its other free end to the front guide frame and trained also about a pair of stationary pulleys.

FIG. 9B shows the shape of the cushion when positioned over the seat panels and the displaceable front guide frame.

Referring now again to FIG. 2, it can be seen that the support frame is also provided with a telescoping transverse connecting member 100 whereby to adjust the spacing between the wheels 33 and this is desirable depending on the width of the seat assembly 25. As also illustrated in FIG. 2, the adjustable seat assembly is further provided with pelvis stabilizing pads 101 on opposed sides of the seat cushion and above a top surface thereof. The pelvis stabilizing pads 101 are removable pads and, as herein shown, they are secured to the armrest 102 and which, as shown in FIG. 1, is provided with slots 103 whereby to adjust the position of the armrest 102 in a vertical plane to suit the intended user. As also shown in FIG. 2, a leg positioner 105 is secured to a slider bar 106 which is secured under the front guide frame whereby to maintain the legs of the intended user spread apart. Of course, if it is necessary to maintain the legs more inwardly, then one of these pads or similar pads may be provided on opposed sides of the seat assembly to maintain the legs more inwardly over the frontal section of the seat cushion. Such positioners are useful for paraplegic users.

Figure 12:
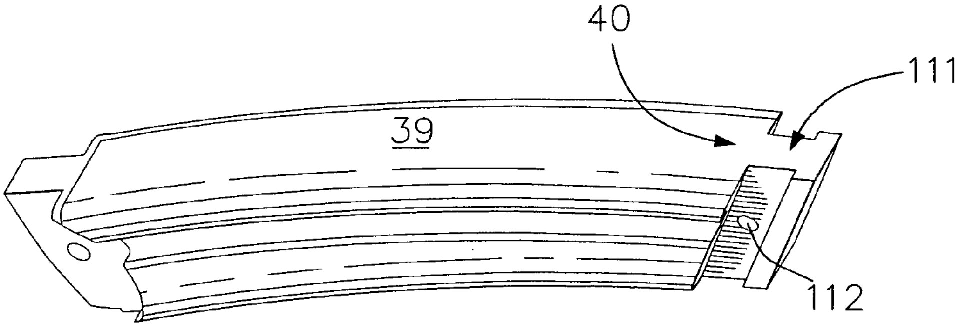
FIG. 12 is a perspective view of the caster support.

Referring now to FIGS. 10 to 14, there will be described in more detail the construction and operation of the multi-position mounting plate 31. The mounting plate 31 is secured to sliding end sections 107 of the telescopic frame through its connecting bracket 108 and the inclined ramp 41 thereof is provided with a connecting slot 109 which has a transverse extended base which is T-shaped as illustrated by phantom line 110 whereby to receive captive therein and, in sliding-fit the T-shaped connector 111 of the support arm 39 as illustrated in FIG. 12. The T-shaped connector 111 is also provided with a through bore 112 which provides a connection to the wheel mounting plate or block 31 through equidistantly spaced apart bores 113 provided in one of the side walls, herein side wall 114 on the inside of the connecting slot 109. A fastener 125 and 125' (see FIG. 13) is removably secured and in threaded engagement with through bore 112 of the support arm 39. Accordingly, the support arm 39 may be adjustable in height with respect to the seat assembly and by moving it upwardly along the incline ramp 41 it can be seen that as the support arm is adjusted upwardly it causes the seat to drop in height and also pulls the front casters 38 inwardly permitting an intended occupant to be able to touch the floor with its feet, if necessary.

The mounting plate or block 31 is provided with a plurality of axel connecting bores 115 to receive a respective one of the axels 32 of the wheels 33 therein whereby to adjust the forward of rear position of the wheel or the height of the chair relative to the wheel axels. Of course, the axels are disposed on a common transverse axis.

Figure 13:
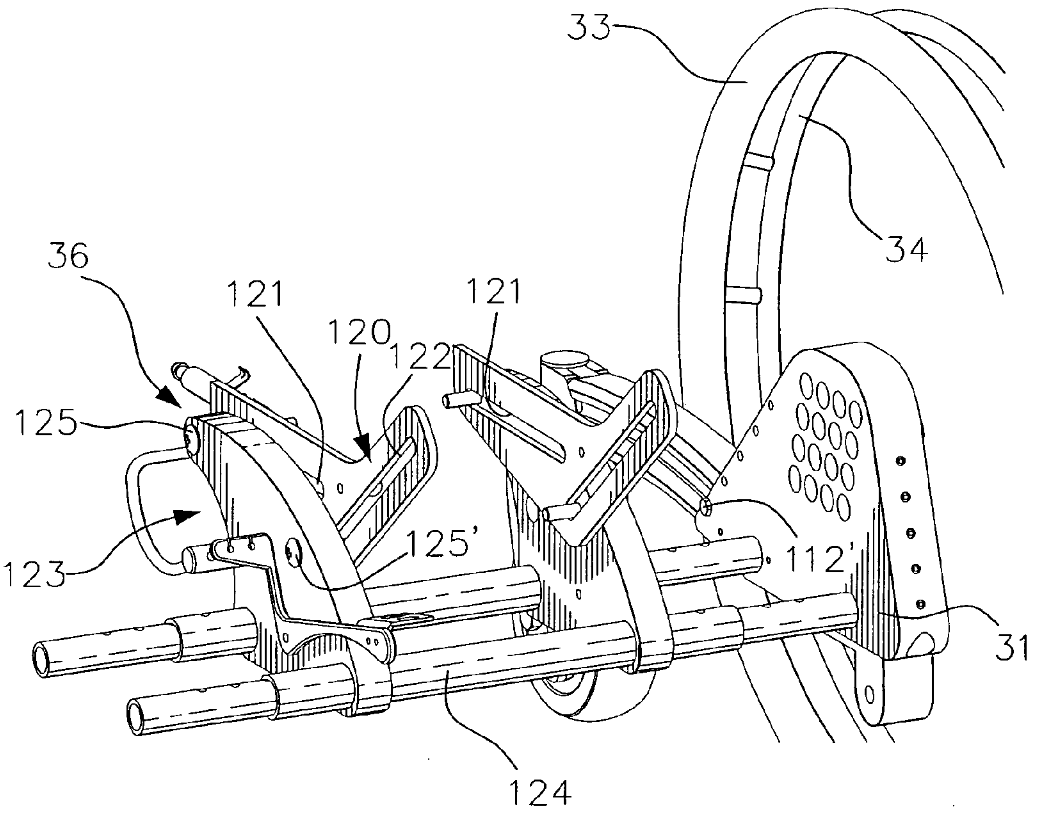
FIG. 13 is a perspective view illustrating the construction of the seat assembly tilting mechanism and FIG. 14 is a perspective view, partly sectioned, illustrating the tilting frame locking mechanism.
Figure 14:
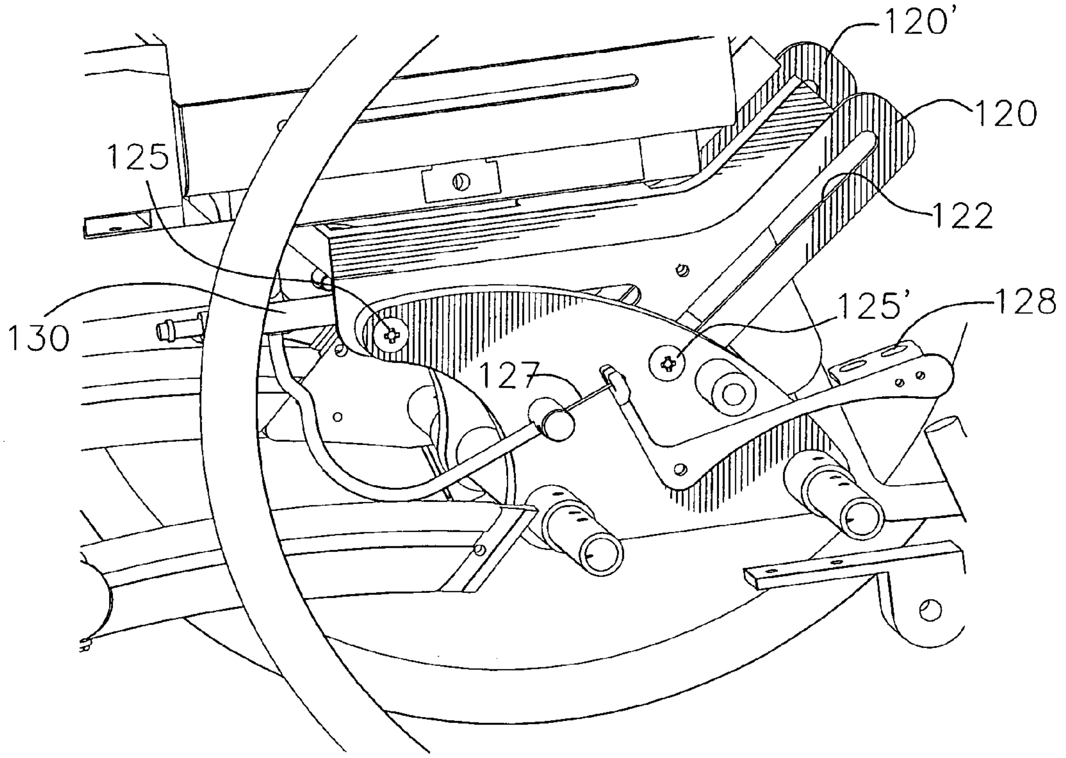

Referring now to FIGS. 13 and 14, it can be seen that the seat tilting mechanism 36 is comprised of a pair of sliding guide plates 120 and 120' which are provided with a frontal horizontal slot 121 and a rearwardly, upwardly inclined rear slot 122. Each sliding guide plate is displaceably connected to a respective mounting plate 123 and 123' which are secured to a support frame member 124. Fastener bolts 125 and 125' extend through the mounting plate 123, and into the slots 121 and 122 respectively of the guide plates 120 and 120'. Through this guide plate connection to the mounting plates it is possible to tilt the seat and backrest assembly to a desired tilt position after the wheels have been secured to the wheel mounting blocks and also depending on the intended user. Depending on the selected connection of the wheels to the mounting blocks and by releasing a lock mechanism, herein a lock cylinder 126 the chair assembly will tend to position itself with respect to the center gravity axis 37. The locking cylinders 130 are actuated by a cable 127 which is connected to a foot pedal 128 located rearwardly of the wheelchair. When the pedal is depressed, the tilting mechanism can move and when released it locks automatically. By providing a pedal instead of hand operable levers mounted on the handgrips 47 there is much less of a chance of an accidental disconnection of the brake. Of course, there could be provided two cylinders, each associated with a respective one of the sliding guide plates to provide a more secure lock but this is not essential.

Although the present invention has been directed to a wheelchair it is not intended to restrict it thereto and it is intended to cover other types of chairs or sofas which may include the seat assembly only or the seat assembly in combination with the backrest assembly. These assemblies can also be operated automatically by several motors connected to the threaded shafts which provide for the displacement of the backrest panels as well as the seat panels. By measuring the parameters of an intended user and inputting these into a computer, a seat could be programmed and configured to receive a preauthorized intended user such as with airplane seats or cinema seats where one would reserve the seat in advance. Therefore, it is within the ambit of the present invention to cover obvious modifications of the preferred embodiment described herein and various intended uses of the adjustable chair described herein, provided such modifications fall within the scope of the appended claims.

What is claimed is:

1. An adjustable chair comprising a support frame, an adjustable seat assembly secured to said support frame, an adjustable backrest assembly secured to a back support frame, said adjustable backrest assembly having displaceable back support elements, backrest adjustment means to adjustably secure said back support elements to a desired position to adjust the vertical length of said backrest, said backrest having a back cushion secured thereto, said back cushion being secured to a cushion extension and retraction mechanism to retract or extend a portion of said cushion in synchronism with said back support elements as said back support elements are displaced along said back support frame to retract or extend said backrest assembly lengthwise, said adjustable seat assembly having a pair of laterally displaceable seat panels each secured to a common laterally displacing mechanism operable to displace said panels to or away from one another in unison to provide equal lateral adjustment of said adjustable seat on opposed sides of a central plane aligned with said backrest, said adjustable seat assembly also having a displaceable front guide frame provided with a seat depth adjustable mechanism to extend and retract said front guide frame, and a seat cushion having opposed lateral sections extendable or retractable with the displacement of said seat panels and a frontal section extendable or retractable in unison with the displacement of said front guide frame.

2. An adjustable chair as claimed in claim 1 wherein said backrest adjustment means, said laterally displaceable mechanism and said seat depth adjustable mechanism have a linear drive mechanism for quick adjustment of said backrest assembly and adjustable seat assembly for comfort fit to a user person.

3. An adjustable chair as claimed in claim 1 wherein said adjustable backrest assembly has a vertical support column, one of said back support elements being a lower back plate secured to said support column, said lower back plate having a lower cushion guide portion about which said backrest cushion may be displaced.

4. An adjustable chair as claimed in claim 3 wherein a further of said back support elements also comprises a displaceable central back plate displaceably secured to said vertical support column for vertical displacement therealong and a displaceable top back plate.

5. An adjustable chair as claimed in claim 4 wherein said central back plate and said top back plate have an independent one of said adjustment means.

6. An adjustable chair as claimed in claim 5 wherein said top back plate and said lower back plate are hingedly mounted, and each have independent locking means to arrest said lower back plate and said top back plate at a desired hinged position along said vertical support column.

7. An adjustable chair as claimed in claim 6 wherein said independent locking means comprises an interconnecting rod secured at one end to a bracket attached to one of said lower back plate or said top back plate and to said vertical support column and a brake mechanism actuable by said interconnecting rod to lock and unlock said hinge mechanism to permit their hinge adjustment.

8. An adjustable chair as claimed in claim 5 wherein said vertical support column is a central support column, said adjustment means being elongated threaded rods secured between stationary connecting brackets, one of said brackets being in threaded engagement with its associated rod, said threaded rods having a rotatably displaceable drive element at one end thereof to impart rotation of said rods whereby to cause displacement of said central back plate or said top back plate.

9. An adjustable chair as claimed in claim 8 wherein said rotatably displaceable drive element is a power tool engaging chuck adapted for rotatable engagement by a power tool.

10. An adjustable chair as claimed in claim 8 wherein said rotatably displaceable drive element is a hand operable knob.

11. An adjustable chair as claimed in claim 4 wherein said top back plate is a shoulder backrest plate and adjustable hinge connectors interconnecting said shoulder backrest plate and said lower back plate to said support column whereby to tilt said shoulder backrest plate and said lower back plate forwardly on a vertical plane of said backrest assembly.

12. An adjustable chair as claimed in claim 3 wherein said adjustable backrest assembly further comprises an adjustable upper side body restraining assembly, said upper side body restraining assembly having vertically supported side pads adjustably secured on opposed sides of said backrest, each said side pad having a mounting bracket secured to a horizontally displaceable support arm whereby to adjust the spacing of each of said side pads relative to said central plane.

13. An adjustable chair as claimed in claim 12 wherein said horizontally displaceable support arm of each of said side pads are interconnected together by a common side pad adjustment mechanism to displace said side pads simultaneously towards or away from one another on respective sides of said central plane.

14. An adjustable chair as claimed in claim 13 wherein said side pad adjustment mechanism includes a threaded rod having a rotatably displaceable drive element at one end thereof to impart rotation thereof whereby to effect said displacement of said pads.

15. An adjustable chair as claimed in claim 12 wherein said side pads are interchangeable side pads, said mounting bracket being an adjustable mounting bracket to provide vertical adjustment of said side pads.

16. An adjustable chair as claimed in claim 1 wherein one of said back support elements is a stationary lower back plate secured to said support column, said lower back plate having a lower cushion guide portion about which said backrest cushion is displaced by said cushion extension and retraction mechanism.

17. An adjustable chair as claimed in claim 16 wherein said cushion extension and retraction mechanism is a cable and pulley mechanism having a cable thereof secured at one end thereof to a free lower end of said backrest cushion and at an opposed end to a vertically displaceable back support element, said cable being trained taunt about a pulley secured to a stationary frame member, there being a cable and pulley mechanism for each said displaceable back support element.

18. An adjustable chair as claimed in claim 17 wherein said lower cushion guide portion is an arcuately shaped lower section of said lower back plate extending rearwardly of said backrest to guide a lower portion of said backrest cushion behind said backrest in close proximity to a rear end of said seat cushion.

19. An adjustable chair as claimed in claim 1 wherein said adjustable seat assembly further comprises pelvis stabilizing pads disposed on each side of said seat cushion and above a top surface thereof, said pelvis stabilizing pads being removably securable to an armrest support frame.

20. An adjustable chair as claimed in claim 19 wherein an armrest is adjustably securable in height to said armrest support frame.

21. An adjustable chair as claimed in claim 1 wherein said pair of laterally displaceable seat panels are displaceable over a lower central seat panel whereby to provide a solid support surface regardless of the position of said laterally displaceable seat panels.

22. An adjustable chair as claimed in claim 21 wherein said displaceable front guide frame is secured to said lower central seat panel by a pair of spaced rigid guide rods to substantially prevent flexing of said front guide frame and a drive rod connected at one end to said front guide frame and in threaded engagement with a stationary frame member to displace said front guide frame.

23. An adjustable chair as claimed in claim 22 wherein said frontal section of said seat cushion is secured at a free end thereof to a first end of a cable of a cable and pulley mechanism, a second end of said cable being secured to said front guide frame and trained about a pair of stationary pulleys.

24. An adjustable chair as claimed in claim 21 wherein said lower central seat panel is concavely V-shaped and, together with said laterally displaceable seat panels, constitutes a concave seat support.

25. An adjustable chair as claimed in claim 21 wherein said laterally displaceable seat panels are secured respectively to a seat panel support frame member, displacement means to adjust the position of said laterally displaceable seat panels, said opposed lateral sections of said seat cushion being secured respectively at a free end thereof to a seat cushion cable and pulley mechanism having a cable thereof secured at one end to said free end and at an opposed end to a respective one of said laterally displaceable seat panels, said cable being trained taunt about a pair of stationary guide pulleys.

26. An adjustable chair as claimed in claim 1 wherein said adjustable chair is a wheelchair for handicapped persons, said wheelchair having opposed wheels equipped with push rims and secured on opposed sides of said adjustable seat assembly.

27. An adjustable chair as claimed in claim 26 wherein said support frame has a telescoping transverse connecting member which is adjustable in length to adjust the lateral spacing between said opposed wheels.

28. An adjustable chair as claimed in claim 26 wherein each of said opposed wheels has an axel which is selectively secured to a multi-position connection of a mounting plate, each mounting plate being secured to said support frame and having a front caster support slidingly secured to an inclined ramp of said mounting plate to provide a position adjustment for front casters of said front caster support relative to said seat assembly whereby to permit a user person to touch a floor support surface with its feet.

29. An adjustable chair as claimed in claim 28 wherein each said mounting plate is provided with a plurality of connecting bores to receive a respective one of said axel for securement thereto, said connecting bores permitting said wheels to be adjustably secured in a forward and rearward direction as well as in an upward or downward direction.

30. An adjustable chair as claimed in claim 28 wherein there is further provided a seat assembly tilting mechanism to displace said seat assembly along a gravity axis of said wheels, said gravity axis extending vertically and aligned with axels of said wheels.

31. An adjustable chair as claimed in claim 30 wherein said tilting mechanism comprises a pair of sliding guide plates secured to a respective side of a seat support frame, each sliding guide plate having a frontal horizontal slot and a rearwardly upward extending rear slot, each sliding guide plate being displaceably connected to a respective mounting plate secured to said support frame by a pair of fastener bolts secured to said mounting plate and extending through a respective one of said frontal horizontal slot and said rear slot, and arresting means to immobilize said sliding guide plates at a desired position relative to said mounting plates.

32. An adjustable chair as claimed in claim 31 wherein said arresting means is constituted by a locking cylinder secured between an immovable frame member and a respective one of said sliding guide plates and actuating means to unlock said cylinder to position said seat assembly at a desired position.

33. An adjustable chair as claimed in claim 32 wherein said actuating means is a foot pedal actuator disposed spaced under said seat frame behind said wheelchair.

34. An adjustable chair as claimed in claim 28 wherein said front caster support is a support rod having an end connector formed integral therewith and configured to be retained captive and in sliding relationship in a connecting slot of said ramp of said mounting plate, said ramp being a rearwardly upward extending straight front edge of said mounting plate, and means to secure said end connector at a desired position along said connecting slot.

35. An adjustable chair as claimed in claim 34 wherein said means to secure is comprised of a fastener disposed in a selected one of a plurality of spaced apart bores formed in a side wall of said connecting slot and extending into a connecting bore of said end connector.

36. An adjustable chair as claimed in claim 1 wherein there is further provided adjustable leg positioning means secured to a slider bar secured under said front guide frame and one or more leg restraining members secured to said slider bar through a respective locking sliding bracket to position said one or more leg restraining members at a desired location over said frontal section of said seat cushion, said adjustable chair being a paraplegic wheelchair.

37. An adjustable chair seat comprising a seat support frame, a pair of laterally displaceable seat panels each secured to a common laterally displacing mechanism operable to displace said panels to or away from one another in unison to provide equal lateral adjustment of said adjustable seat on opposed sides of a central plane aligned with a backrest, said adjustable seat also having a displaceable front guide frame provided with a seat depth adjustable mechanism to extend and retract said front guide frame and a seat cushion having opposed lateral sections extendable or retractable with the displacement of said seat panels and a frontal section extendable or retractable in unison with the displacement of said front guide frame.

38. An adjustable chair seat as claimed in claim 37 wherein said laterally displaceable mechanism and said seat depth adjustable mechanism have a linear drive mechanism for quick adjustment of said seat panels and front guide frame to customize said chair seat to an intended user person.

39. An adjustable chair seat as claimed in claim 37 wherein said pair of laterally displaceable seat panels are displaceable over a lower central seat panel whereby to provide a solid support surface regardless of the position of said laterally displaceable seat panels.

40. An adjustable chair seat as claimed in claim 39 wherein said displaceable front guide frame is secured to said lower central seat panel by a pair of spaced rigid guide rods to substantially prevent flexing of said front guide frame and a drive rod connected at one end to said front guide frame and in threaded engagement with an immovable frame member to displace said front guide frame.

41. An adjustable chair seat as claimed in claim 40 wherein said frontal section of said seat cushion is secured at a free end thereof to a first end of a cable of a cable and pulley mechanism, a second end of said cable being secured to said front guide frame and trained about a pair of stationary pulleys.

42. An adjustable chair seat as claimed in claim 39 wherein said lower central seat panel is concavely V-shaped and, together with said laterally displaceable seat panels, constitutes a concave seat support.

43. An adjustable chair seat as claimed in claim 39 wherein said laterally displaceable seat panels are secured respectively to a seat panel support frame member, displacement means to adjust the position of said laterally displaceable seat panels, said opposed lateral sections of said seat cushion being secured respectively at a free end thereof to a seat cushion cable and pulley mechanism having a cable thereof secured at one end to said free end and at an opposed end to a respective one of said laterally displaceable seat panels, said cable being trained taunt about a pair of stationary guide pulleys.

44. An adjustable chair seat as claimed in claim 37 in combination with an adjustable backrest assembly secured to a back support frame, said backrest assembly having displaceable back support elements, backrest adjustment means to adjustably secure said back support elements to a desired position to adjust the vertical length of said backrest, said backrest having a back cushion secured thereto, said back cushion being secured to a cushion extension and retraction mechanism to retract or extend a portion of said cushion in synchronism with said back support elements as said back support elements are displaced along said back, support frame to retract or extend said backrest assembly lengthwise.

45. An adjustable chair seat as claimed in claim 44 wherein said back support frame is a vertical support column, one of said back support elements being a lower back plate secured to said support column, said lower back plate having a lower cushion guide portion about which said backrest cushion may be displaced.

* * * * *